June 14, 1927.

T. G. JOHNSON 1,632,233

CONVERTIBLE SEAT FOR MOTOR VEHICLES

Filed July 21, 1925   2 Sheets-Sheet 1

Witness:
Fred C. Fischer.

Inventor:
Theodore G. Johnson,
By F. G. Fischer,
Attorney,

June 14, 1927.
T. G. JOHNSON
1,632,233
CONVERTIBLE SEAT FOR MOTOR VEHICLES
Filed July 21, 1925    2 Sheets-Sheet 2
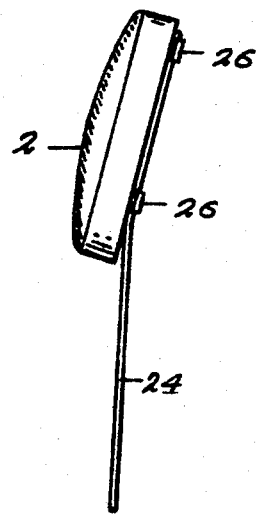
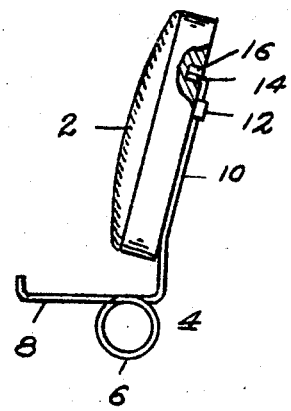
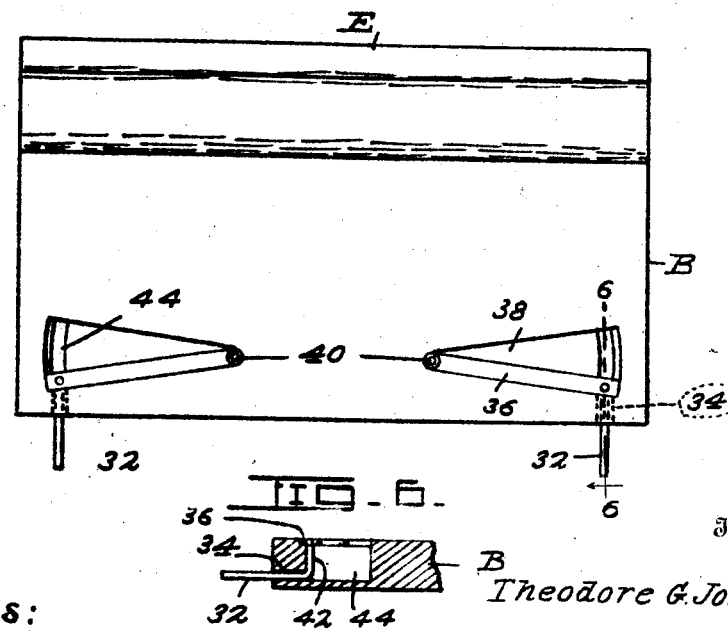
Witness:
Fred C. Fischer.
Inventor:
Theodore G. Johnson,
By F. C. Fischer,
Attorney.

Patented June 14, 1927.

1,632,233

UNITED STATES PATENT OFFICE.

THEODORE G. JOHNSON, OF KANSAS CITY, MISSOURI.

CONVERTIBLE SEAT FOR MOTOR VEHICLES.

Application filed July 21, 1925. Serial No. 45,043.

My invention relates to seats with adjustable backs and while it may be used on various kinds of seats, in the present instance I have shown it applied to the back of the front seat of a motor vehicle, so that the front and rear seats thereof can be readily converted into a bed when the back of the front seat is lowered from normal to a reclining position, thereby rendering the invention desirable for tourists and others having occasion to spend the night in the motor vehicle.

In order that the invention may be fully understood reference will now be had to the accompanying drawings, in which:

Fig. 3 is a detail side view of the adjustable back and means for holding the same in normal position or raised position.

Fig. 4 is a detail side elevation of the adjustable back with the flexible support therefor.

Fig. 5 is a plan view of the rear seat with the cushion removed to show means for holding the adjustable back in a reclining position.

Fig. 6 is a section on line 6—6 of Fig. 5.

A and B designate the front and rear seats, respectively, of the motor vehicle. The seats A and B are provided with the usual cushions C and D, respectively and the rear seat has the customary back E.

Figure 1:
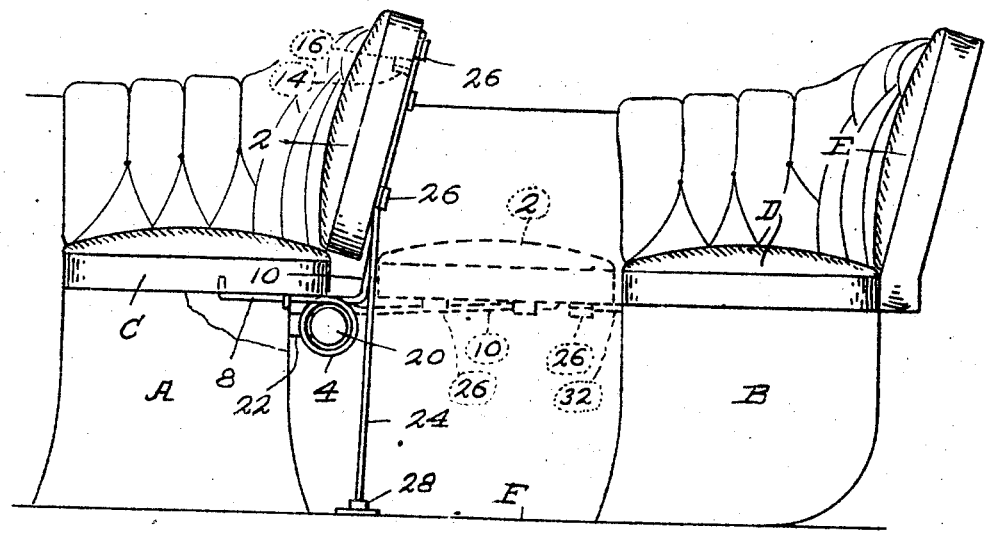
Fig. 1 is a fragmentary interior view of a motor vehicle equipped with the invention.
Figure 2:
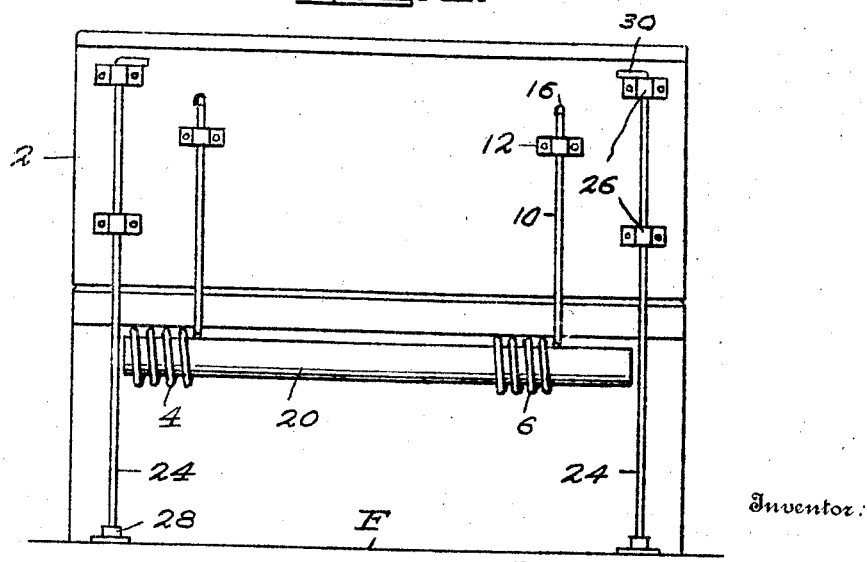
Fig. 2 is a rear elevation of the front seat with the adjustable back.

The front seat A is provided with an adjustable back 2 preferably upholstered like the cushions C and D to provide a comfortable bed when the back 2 is lowered from the raised or normal position disclosed by full lines to the reclining or dotted line position, Fig. 1.

The back 2 is adjustably connected to the front seat A by springs 4, each of which comprises a coil 6, an arm 8 secured to the frame of the seat A, and an arm 10 secured to the back 2 by a loop 12. The arm 10 is further secured to the back 2 by having its upper end 14 bent at right angles and entering a slot 16 in said back 2.

The coils 6 of the springs 4 are held from displacement by a rod 20 extending through said coils and fixed to blocks 22 secured to the rear portion of the seat A.

The back 2 is secured in raised or normal position by a pair of rods 24 extending downwardly through keepers 26, secured to the back 2, and entering sockets 28 fixed to the floor F of the vehicle. The upper ends of the rods 24 are bent at right angles to form handles 30 whereby said rods can be readily manipulated in withdrawing them from the sockets 28 and the keepers 26 when the adjustable back 2 is to be lowered to the reclining position disclosed by dotted lines, Fig. 1.

The back 2 is secured in lowered position by a pair of bolts 32 projecting through openings 34 in the rear seat B and pivotally connected at their rear ends to levers 36 arranged in recesses 38 in said rear seat B. The rear upturned ends 42 of the bolts 32 operate in slots 44 communicating with the recesses 38 and like the same are formed in the rear seat B. The levers 36 are mounted at their adjacent ends upon pivots 40, so that their free ends may be swung forward and backward to project and retract the bolts 32.

In practice the adjustable back 2 is held in raised or normal position by the rods 24, which are sufficiently resilient to permit them to be bent after passing through the lower keepers 26 to enter the sockets 28. When the seats are to be converted into a couch or bed the rods 24 are removed and the back 2 is adjusted to the dotted line position, Fig. 1, in which position it is secured by projecting the bolts 32 into the adjacent keepers 26. There is sufficient play between the bolts 32 and the keepers 26 to permit the springs 4 to function so that the back 2 may yield more or less beneath the weight of a person reclining upon the bed. The loose connection between the slots 16 and the ends 14 of the springs 4 also cooperate with the loose fit between the bolts 32 and the keepers 26 to permit the seat 2 to yield beneath the weight of a person so that the back 2, in connection with the seats A and B with the cushions C and D, will afford a comfortable bed.

From the foregoing description it is apparent that I have provided means whereby the front and rear seats of a motor vehicle may be readily converted into a bed, and while I have shown and described the preferred construction, combination and arrangement of parts, I reserve the right to such changes and modifications as properly fall within the spirit and scope of the invention as claimed.

Having thus described my invention, what I claim and desire to secure by Letters Patent, is:

In combination with the front and rear seats of a motor vehicle, means yieldably supporting the back of the front seat so that said back may be adjusted from normal to a reclining position to cooperate with the front and rear seats in forming a bed, keepers secured to said back, rods removably mounted in said keepers to support said back in normal position, and bolts associated with the rear seat and adapted to engage certain of said keepers to secure the adjustable back in reclining position.

In testimony whereof I affix my signature.

THEODORE G. JOHNSON.